(12) United States Patent
Khare (10) Patent No.: US 11,895,580 B2
(45) Date of Patent: Feb. 6, 2024

(54) METHOD, APPARATUS AND COMPUTER PROGRAM TO PROVIDE DATA TO A NETWORK FUNCTION CONSUMER

(71) Applicant: NOKIA SOLUTIONS AND NETWORKS OY, Espoo (FI)

(72) Inventor: Saurabh Khare, Bangalore (IN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 57 days.

(21) Appl. No.: 17/590,267

(22) Filed: Feb. 1, 2022

(65) Prior Publication Data
US 2022/0256447 A1 Aug. 11, 2022

(30) Foreign Application Priority Data
Feb. 9, 2021 (IN) .............................. 202141005545

(51) Int. Cl.
H04W 48/18 (2009.01)
H04W 4/70 (2018.01)
H04W 8/18 (2009.01)
H04L 67/133 (2022.01)

(52) U.S. Cl.
CPC ........... *H04W 48/18* (2013.01); *H04L 67/133* (2022.05); *H04W 4/70* (2018.02); *H04W 8/18* (2013.01)

(58) Field of Classification Search
CPC ......... H04W 48/18; H04W 4/70; H04W 8/18; H04L 67/133
USPC ........................................................ 370/329
See application file for complete search history.

(56) References Cited

U.S. PATENT DOCUMENTS

| 10,769,000 | B1 | 9/2020 | Plunk et al. | |
| 2011/0161940 | A1* | 6/2011 | Brunswig | G06F 8/40 717/139 |
| 2014/0047368 | A1* | 2/2014 | Yang | G06F 8/36 715/769 |
| 2021/0250411 | A1* | 8/2021 | Cakulev | H04L 67/52 |

OTHER PUBLICATIONS

Extended European Search Report dated Jun. 22, 2022, corresponding to European Patent Application No. 22153978.6.
Office Action and Search Report dated Apr. 20, 2023, corresponding to Chinese Patent Application No. 2022101191477.
"API Version", Ericsson, 3GPP TSG-CT WG4 Meeting #95 C4-195467. Nov. 11-15, 2019.

* cited by examiner

Primary Examiner — Mark G. Pannell
(74) Attorney, Agent, or Firm — SQUIRE PATTON BOGGS (US) LLP (57) ABSTRACT

There is provided an apparatus comprising means for: receiving, at a coordinating network function from a network function consumer, at least one data request, wherein the at least one data request indicates at least one version of an application programming interface supported by the network function consumer; and causing, by the coordinating network function, data to be provided to the network function consumer from at least one data source based on the at least one data request and one or more versions of an application programming interface supported by the at least one data source.

17 Claims, 8 Drawing Sheets

METHOD, APPARATUS AND COMPUTER PROGRAM TO PROVIDE DATA TO A NETWORK FUNCTION CONSUMER

CROSS REFERENCE TO RELATED APPLICATION

This application claims the benefit of Indian Application No. 202141005545, filed Feb. 9, 2021. The entire content of the above-referenced application is hereby incorporated by reference.

FIELD

The present application relates to a method, apparatus, and computer program and in particular but not exclusively to providing data to a network function consumer.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). Some wireless systems can be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP).

SUMMARY

According to an aspect, there is provided an apparatus comprising means for: receiving, at a coordinating network function from a network function consumer, at least one data request, wherein the at least one data request indicates at least one version of an application programming interface supported by the network function consumer; and causing, by the coordinating network function, data to be provided to the network function consumer from at least one data source based on the at least one data request and one or more versions of an application programming interface supported by the at least one data source.

The at least one data request may comprise a plurality of identifiers, wherein each of the plurality of identifiers indicates a respective application programming interface supported by the network function consumer.

The means may be for providing, to a network repository function, an indication that the coordinating network function supports multiple versions of an application programming interface.

The means may be for sending, to the at least one data source, information for causing the data to be delivered to the network function consumer.

The means may be for selecting, by the coordinating network function, the at least one data source for providing the data based on whether the version of the application programming interface supported by the at least one data source is also supported by the network function consumer.

The means may be for sending, to the network function consumer, a request for an indication of one or more versions of the application programming interface supported by the network function consumer; and receiving, from the network function consumer, the indication of the one or more versions of the application programming interface supported by the network function consumer.

The at least one data source may comprise a plurality of data sources, and wherein each of the plurality of data sources supports one or more versions of the application programming interface.

The means may be for receiving, from the at least one data source, the data via a first version of the application programming interface; converting the data from the first version of the application programming interface to a second version of the application programming interface; and causing the data to be sent to the network function consumer via the second version of the application programming interface.

The apparatus may comprise at least one of: a data collection coordination function; a data repository function; a messaging framework; and a network data application function.

The coordinating network function may be one of: a data collection coordination function; a network data application function; a messaging framework; and a data repository function.

According to an aspect, there is provided an apparatus comprising means for: transmitting, to a coordinating network function from a network function consumer, at least one data request, wherein the at least one data request indicates at least one version of an application programming interface supported by the network function consumer; and receiving, at the network function consumer, data based on the at least one data request and one or more versions of an application programming interface supported by at least one data source.

The data may be received from at least one of: the at least one data source; the coordinating network function; a messaging framework; and a data repository function.

The at least one data request may comprise a plurality of data requests, wherein each of the plurality of data requests indicates a respective version of the application programming interface supported by the network function consumer.

The means may be for receiving, from the coordinating network function, a request for an indication of one or more versions of the application programming interface supported by the apparatus; and transmitting, to the coordinating network function, the indication of the one or more versions of the application programming interface supported by the apparatus.

The means may be for transmitting, from the network function consumer to a network repository function, a message for discovering the data collection coordination function; and receiving, at the network function consumer from the network repository function, a response identifying the data collection coordination function and information indicating that the data collection coordination function supports multiple versions of an application programming interface.

According to an aspect, there is provided an apparatus comprising at least one processor and at least one memory including a computer program code, the at least one memory and computer program code configured to, with the at least one processor, cause the apparatus at least to: receive, at a coordinating network function from a network function consumer, at least one data request, wherein the at least one data request indicates at least one version of an application programming interface supported by the network function consumer; and cause, by the coordinating network function, data to be provided to the network function consumer from at least one data source based on the at least one data request and one or more versions of an application programming interface supported by the at least one data source.

The at least one data request may comprise a plurality of identifiers, wherein each of the plurality of identifiers indicates a respective application programming interface supported by the network function consumer.

The at least one memory and at least one processor may be configured to cause the apparatus to provide, to a network repository function, an indication that the coordinating network function supports multiple versions of an application programming interface.

The at least one memory and at least one processor may be configured to cause the apparatus to send, to the at least one data source, information for causing the data to be delivered to the network function consumer.

The at least one memory and at least one processor may be configured to cause the apparatus to select, by the coordinating network function, the at least one data source for providing the data based on whether the version of the application programming interface supported by the at least one data source is also supported by the network function consumer.

The at least one memory and at least one processor may be configured to cause the apparatus to send, to the network function consumer, a request for an indication of one or more versions of the application programming interface supported by the network function consumer; and receive, from the network function consumer, the indication of the one or more versions of the application programming interface supported by the network function consumer.

The at least one data source may comprise a plurality of data sources, and wherein each of the plurality of data sources supports one or more versions of the application programming interface.

The at least one memory and at least one processor may be configured to cause the apparatus to receive, from the at least one data source, the data via a first version of the application programming interface; convert the data from the first version of the application programming interface to a second version of the application programming interface; and cause the data to be sent to the network function consumer via the second version of the application programming interface.

The apparatus may comprise at least one of: a data collection coordination function; a data repository function; a messaging framework; and a network data application function.

The coordinating network function may be one of: a data collection coordination function; a network data application function; a messaging framework; and a data repository function.

According to an aspect, there is provided an apparatus comprising at least one processor and at least one memory including a computer program code, the at least one memory and computer program code configured to, with the at least one processor, cause the apparatus at least to: transmit, to a coordinating network function from a network function consumer, at least one data request, wherein the at least one data request indicates at least one version of an application programming interface supported by the network function consumer; and receive, at the network function consumer, data based on the at least one data request and one or more versions of an application programming interface supported by at least one data source.

The data may be received from at least one of: the at least one data source; the coordinating network function; a messaging framework; and a data repository function.

The at least one data request may comprise a plurality of data requests, wherein each of the plurality of data requests indicates a respective version of the application programming interface supported by the network function consumer.

The at least one memory and at least one processor may be configured to cause the apparatus to receive, from the coordinating network function, a request for an indication of one or more versions of the application programming interface supported by the apparatus; and transmit, to the coordinating network function, the indication of the one or more versions of the application programming interface supported by the apparatus.

The at least one memory and at least one processor may be configured to cause the apparatus to transmit, from the network function consumer to a network repository function, a message for discovering the data collection coordination function; and receive, at the network function consumer from the network repository function, a response identifying the data collection coordination function and information indicating that the data collection coordination function supports multiple versions of an application programming interface.

According to an aspect, there is provided a method comprising: receiving, at a coordinating network function from a network function consumer, at least one data request, wherein the at least one data request indicates at least one version of an application programming interface supported by the network function consumer; and causing, by the coordinating network function, data to be provided to the network function consumer from at least one data source based on the at least one data request and one or more versions of an application programming interface supported by the at least one data source.

The at least one data request may comprise a plurality of identifiers, wherein each of the plurality of identifiers indicates a respective application programming interface supported by the network function consumer.

The method may comprise providing, to a network repository function, an indication that the coordinating network function supports multiple versions of an application programming interface.

The method may comprise sending, to the at least one data source, information for causing the data to be delivered to the network function consumer.

The method may comprise selecting, by the coordinating network function, the at least one data source for providing the data based on whether the version of the application programming interface supported by the at least one data source is also supported by the network function consumer.

The method may comprise sending, to the network function consumer, a request for an indication of one or more versions of the application programming interface supported by the network function consumer; and receiving, from the network function consumer, the indication of the one or more versions of the application programming interface supported by the network function consumer.

The at least one data source may comprise a plurality of data sources, and wherein each of the plurality of data sources supports one or more versions of the application programming interface.

The method may comprise receiving, from the at least one data source, the data via a first version of the application programming interface; converting the data from the first version of the application programming interface to a second version of the application programming interface; and causing the data to be sent to the network function consumer via the second version of the application programming interface.

The coordinating network function may be one of: a data collection coordination function; a network data application function; a messaging framework; and a data repository function.

According to an aspect, there is provided a method comprising: transmitting, to a coordinating network function from a network function consumer, at least one data request, wherein the at least one data request indicates at least one version of an application programming interface supported by the network function consumer; and receiving, at the network function consumer, data based on the at least one data request and one or more versions of an application programming interface supported by at least one data source.

The data may be received from at least one of: the at least one data source; the coordinating network function; a messaging framework; and a data repository function.

The at least one data request may comprise a plurality of data requests, wherein each of the plurality of data requests indicates a respective version of the application programming interface supported by the network function consumer.

The method may comprise receiving, from the coordinating network function, a request for an indication of one or more versions of the application programming interface supported by the apparatus; and transmitting, to the coordinating network function, the indication of the one or more versions of the application programming interface supported by the apparatus.

The method may comprise transmitting, from the network function consumer to a network repository function, a message for discovering the data collection coordination function; and receiving, at the network function consumer from the network repository function, a response identifying the data collection coordination function and information indicating that the data collection coordination function supports multiple versions of an application programming interface.

According to an aspect, there is provided a computer readable medium comprising program instructions for causing an apparatus to perform at least the following: receiving, at a coordinating network function from a network function consumer, at least one data request, wherein the at least one data request indicates at least one version of an application programming interface supported by the network function consumer; and causing, by the coordinating network function, data to be provided to the network function consumer from at least one data source based on the at least one data request and one or more versions of an application programming interface supported by the at least one data source.

The at least one data request may comprise a plurality of identifiers, wherein each of the plurality of identifiers indicates a respective application programming interface supported by the network function consumer.

The apparatus may be further caused to perform providing, to a network repository function, an indication that the coordinating network function supports multiple versions of an application programming interface.

The apparatus may be further caused to perform sending, to the at least one data source, information for causing the data to be delivered to the network function consumer.

The method may comprise selecting, by the coordinating network function, the at least one data source for providing the data based on whether the version of the application programming interface supported by the at least one data source is also supported by the network function consumer.

The apparatus may be further caused to perform sending, to the network function consumer, a request for an indication of one or more versions of the application programming interface supported by the network function consumer; and receiving, from the network function consumer, the indication of the one or more versions of the application programming interface supported by the network function consumer.

The at least one data source may comprise a plurality of data sources, and wherein each of the plurality of data sources supports one or more versions of the application programming interface.

The apparatus may be further caused to perform receiving, from the at least one data source, the data via a first version of the application programming interface; converting the data from the first version of the application programming interface to a second version of the application programming interface; and causing the data to be sent to the network function consumer via the second version of the application programming interface.

The coordinating network function may be one of: a data collection coordination function; a network data application function; a messaging framework; and a data repository function.

According to an aspect, there is provided a computer readable medium comprising program instructions for causing an apparatus to perform at least the following: transmitting, to a coordinating network function from a network function consumer, at least one data request, wherein the at least one data request indicates at least one version of an application programming interface supported by the network function consumer; and receiving, at the network function consumer, data based on the at least one data request and one or more versions of an application programming interface supported by at least one data source.

The data may be received from at least one of: the at least one data source; the coordinating network function; a messaging framework; and a data repository function.

The at least one data request may comprise a plurality of data requests, wherein each of the plurality of data requests indicates a respective version of the application programming interface supported by the network function consumer.

The apparatus may be further caused to perform receiving, from the coordinating network function, a request for an indication of one or more versions of the application programming interface supported by the apparatus; and transmitting, to the coordinating network function, the indication of the one or more versions of the application programming interface supported by the apparatus.

The apparatus may be further caused to perform transmitting, from the network function consumer to a network repository function, a message for discovering the data collection coordination function; and receiving, at the network function consumer from the network repository function, a response identifying the data collection coordination function and information indicating that the data collection coordination function supports multiple versions of an application programming interface.

According to an aspect, there is provided a non-transitory computer readable medium comprising program instructions for causing an apparatus to perform at least the method according to any of the preceding aspects.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

In the following, certain examples are explained with reference to mobile communication devices capable of communication via a wireless cellular system and mobile communication systems serving such mobile communication devices. Before explaining in detail the exemplifying mechanisms, certain general principles of a 5G wireless communication system are briefly explained with reference to FIG. 1.

Figure 1:
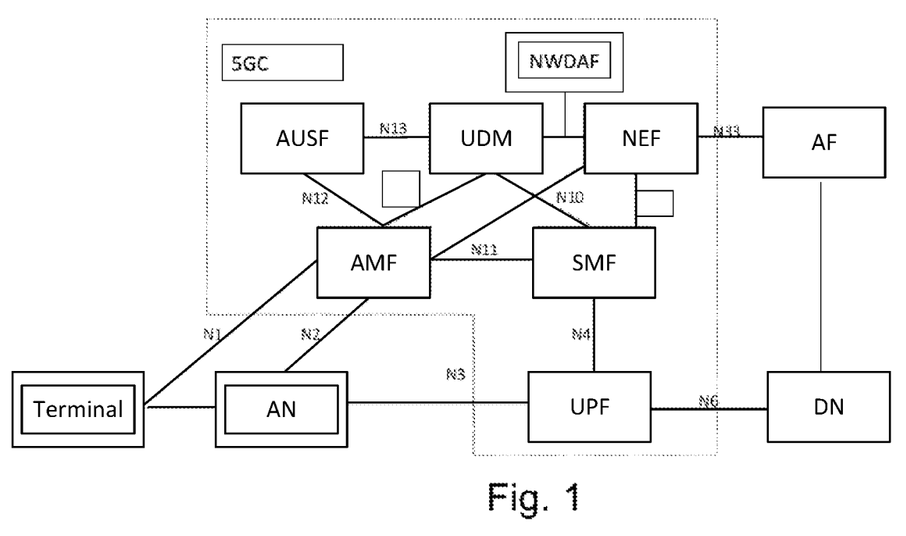
FIG. 1 shows a representation of a network system according to some example embodiments.

FIG. 1 shows a schematic representation of a 5G system (5GS). The 5GS may comprise a terminal (which may also be referred to as a user equipment (UE) or a communication device), a 5G access network (AN) (which may be a 5G Radio Access Network (RAN) or any other type of 5G AN such as a Non-3GPP Interworking Function (N3IWF)/a Trusted Non3GPP Gateway Function (TNGF) for Untrusted/Trusted Non-3GPP access or Wireline Access Gateway Function (W-AGF) for Wireline access), a 5G core (5GC), one or more application functions (AF) and one or more data networks (DN).

The 5G RAN may comprise one or more gNodeB (gNB) distributed unit functions connected to one or more gNodeB (gNB) centralized unit functions. The RAN may comprise one or more access nodes.

The 5GC may comprise one or more access management functions (AMF), one or more session management functions (SMF), one or more authentication server functions (AUSF), one or more unified data management (UDM) functions, one or more user plane functions (UPF), one or more unified data repository (UDR) functions, one or more policy control functions (PCF), and/or one or more network exposure functions (NEF). A PCF is not depicted in FIG. 1 for clarity reasons, as the PCF may have a plurality of interfaces with other network functions, such as AMF (via interface N15), SMF (via interface N7), UDR (through interface N36), network data analytics function (NWDAF) (through interface N23), and many other network functions.

The 5GC also comprises a network data analytics function (NWDAF). The NWDAF is responsible for providing network analytics information upon request from one or more network functions or apparatus within the network. Network functions can also subscribe to the NWDAF to receive information therefrom. Accordingly, the NWDAF is also configured to receive and store network information from one or more network functions or apparatus within the network. The data collection by the NWDAF may be performed based on at least one subscription to the events provided by the at least one network function. Additionally, while not shown in FIG. 1, in some examples a data collection coordination function (DCCF) and data repository function (DRF) may be co-located with an NWDAF. Alternatively, one or more functionalities provided by the DCCF and DRF can be hosted by an NWDAF or can be deployed as individual NFs. In some examples DRF is also called analytical data repository function (ADRF).

Figure 2:
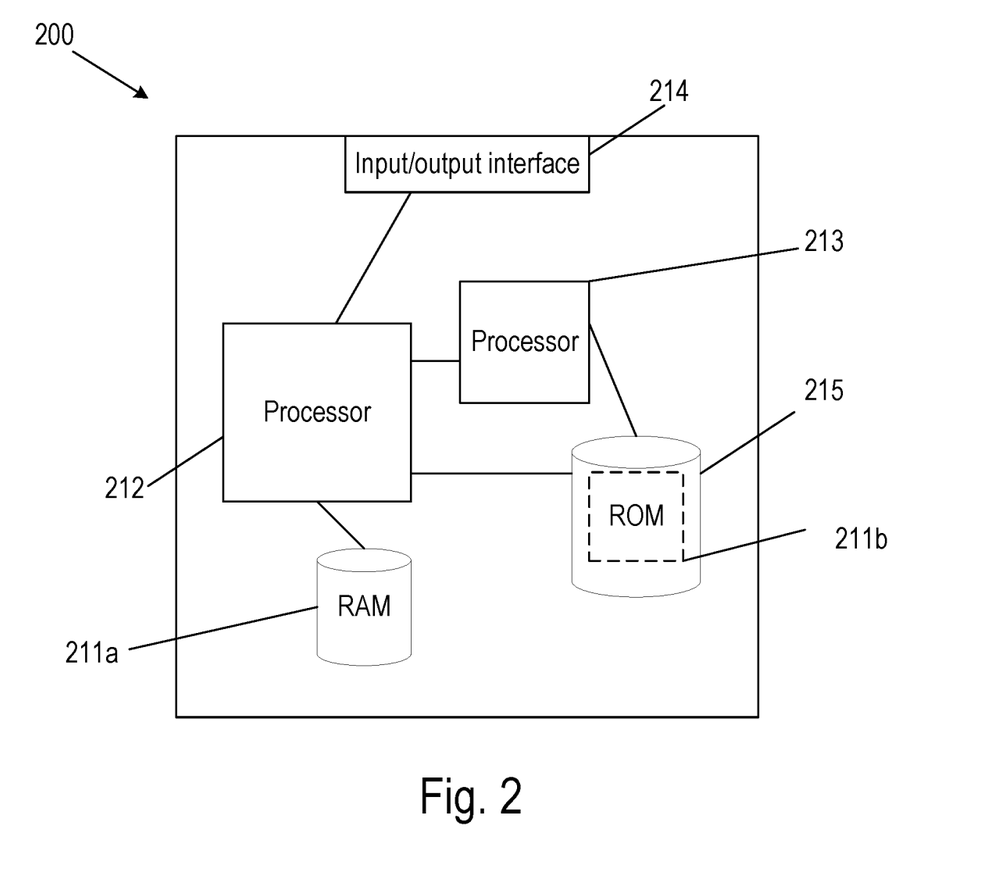
FIG. 2 shows a representation of a control apparatus according to some example embodiments.

FIG. 2 illustrates an example of a control apparatus or, in short, apparatus 200 for controlling a function of the 5GRAN or the 5GC as illustrated on FIG. 1. The control apparatus may comprise at least one random access memory (RAM) 211*a*, at least on read only memory (ROM) 211*b*, at least one processor 212, 213 and an input/output interface 214. The at least one processor 212, 213 may be coupled to the RAM 211*a* and the ROM 211*b*. The at least one processor 212, 213 may be configured to execute an appropriate software code 215. The software code 215 may for example allow to perform one or more steps to perform one or more of the present aspects. The software code 215 may be stored in the ROM 211*b*. The control apparatus 200 may be interconnected with another control apparatus 200 controlling another function of the 5GRAN or the 5GC. In some embodiments, each function of the 5GRAN or the 5GC comprises a control apparatus 200. In alternative embodiments, two or more functions of the 5GRAN or the 5GC may share a control apparatus.

Figure 3:
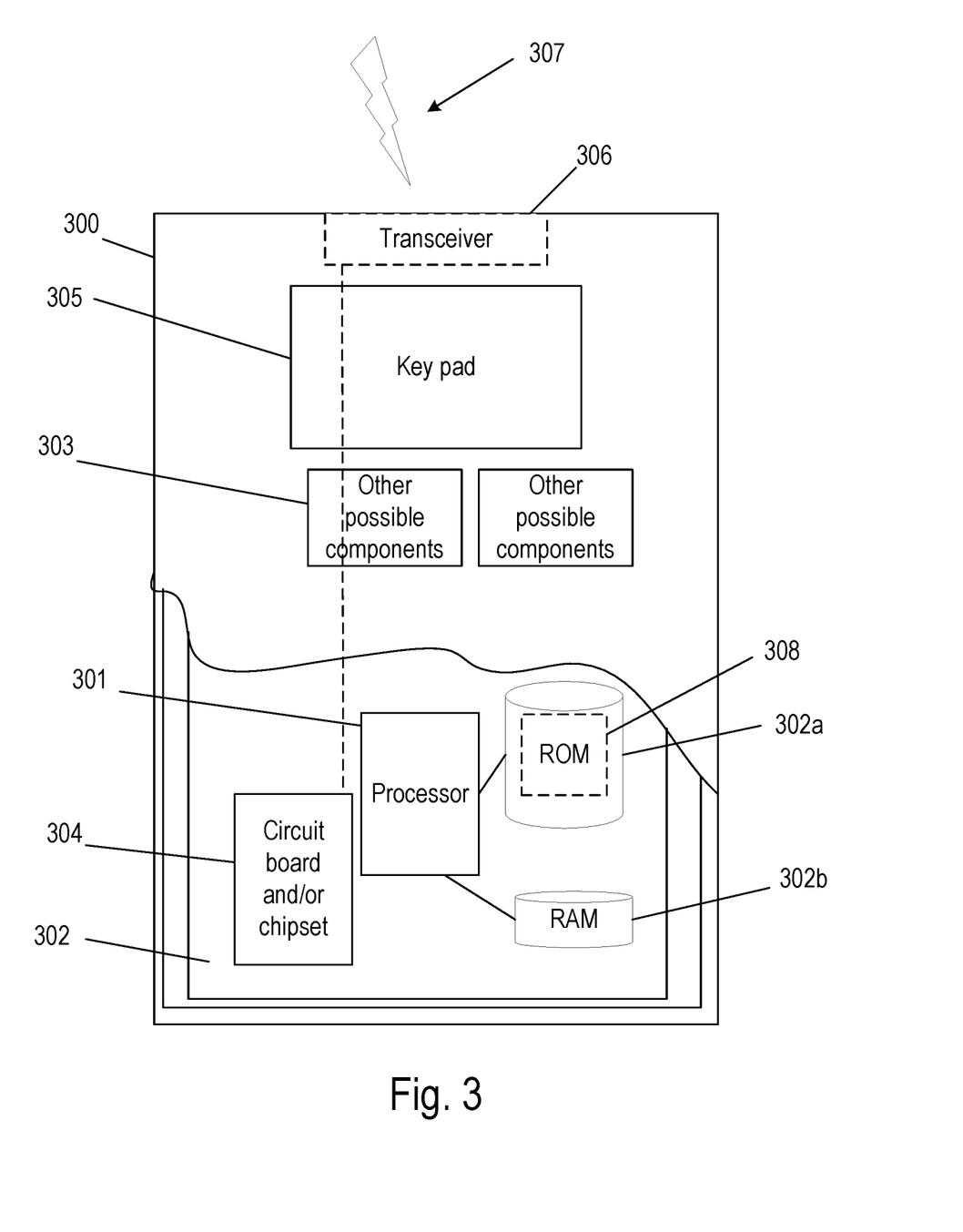
FIG. 3 shows a representation of an apparatus according to some example embodiments.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, an Internet of things (IoT) type communication device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302a, at least one RAM 302b and other possible components 303 for use in software and hardware aided execution of tasks it is designed to perform, including control of access to and communications with access systems and other communication devices. The at least one processor 301 is coupled to the RAM 311a and the ROM 311b. The at least one processor 301 may be configured to execute an appropriate software code 308. The software code 308 may for example allow to perform one or more of the present aspects. The software code 308 may be stored in the ROM 311b.

The processor, storage and other relevant control apparatus can be provided on an appropriate circuit board and/or in chipsets. This feature is denoted by reference 304. The device may optionally have a user interface such as key pad 305, touch sensitive screen or pad, combinations thereof or the like. Optionally one or more of a display, a speaker and a microphone may be provided depending on the type of the device.

As explained above, the NWDAF is responsible for providing network analytics information upon request from one or more network functions or apparatus within the network. Network functions can also subscribe to the NWDAF to receive information therefrom. The NWDAF may be integrated into a data management framework in order to make use of the analytics collected from different data sources by the NWDAF.

Figure 4:
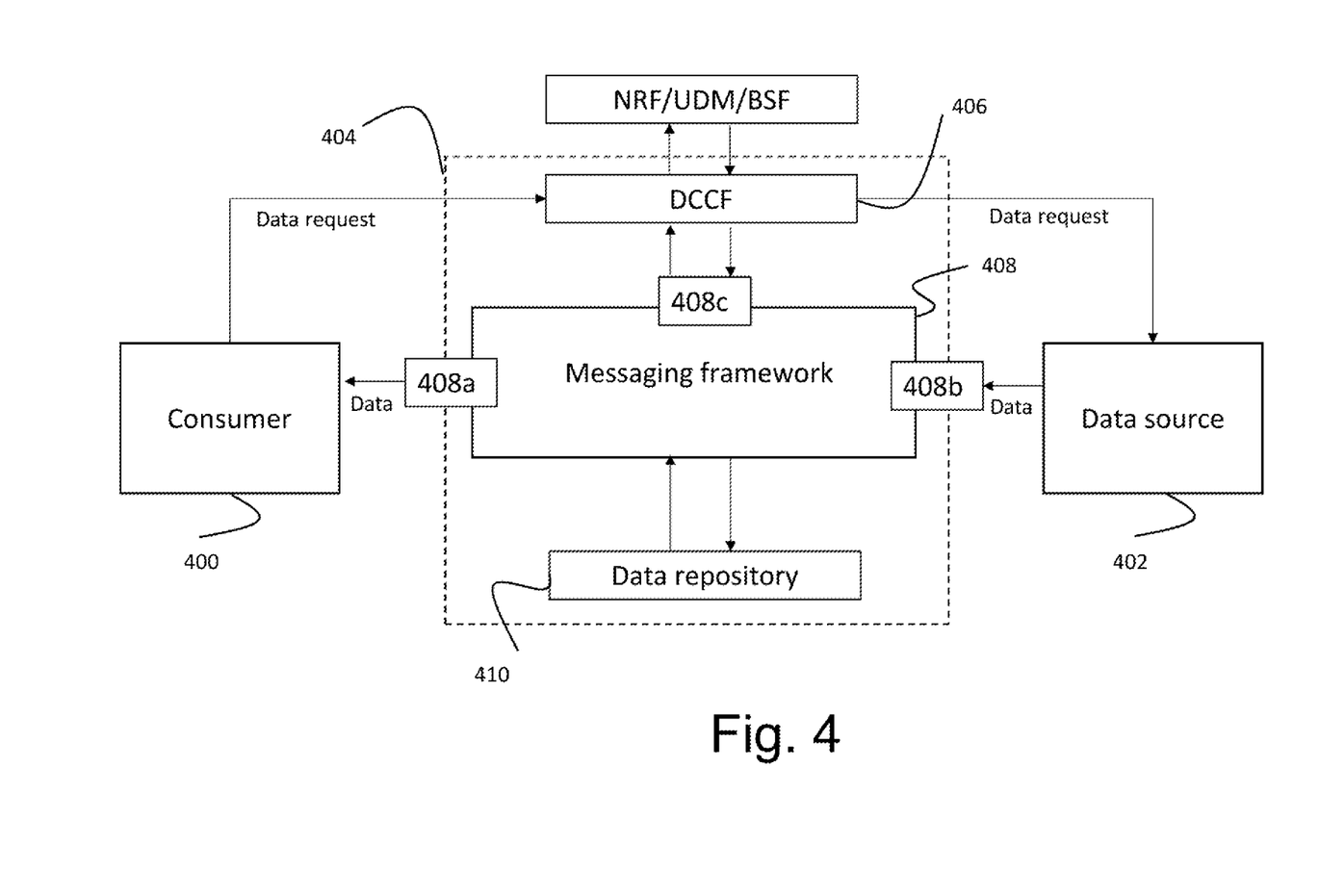
FIG. 4 shows an example data management framework.

An example data management framework is shown in FIG. 4.

In the example framework of FIG. 4, a data consumer 400 wants to consume data originating at a data source 402. A data management framework 404 may facilitate the delivery of the data from data source 402 to data consumer 400.

The data management framework 404 may comprise a data collection coordination function (DCCF) 406, a messaging framework 408, and data repository 410. The messaging framework may comprise adaptors 408a-c to interface with the data consumer 400, data source 402, and DCCF 406. The messaging framework may be called a Messaging Adaptor function (MAF) in some examples.

Data consumer may send a request for data to DCCF 406. The request may for example comprise a subscribe message. DCCF 406 may determine a data source based on the request. The DCCF 406 may also communicate with other entities in the 5G core, including but not limited to the NRF, UDM or BSF, in order to determine the data source 402. For example, the DCCF 406 may determine a serving NF per UE.

Having determined the data source 402, the DCCF 406 may forward the data request to the determined data source 402. The data source 402 may then deliver the data to the data consumer 400 via messaging framework 408. For example, data source 402 may provide the data in a notification message. DCCF 406 may coordinate data delivery over messaging framework 408.

In some examples, the data consumer may be a NWDAF, AF and NEF, or any other Network Function. The data source may be a NWDAF, AMF, DRF, AF and NEF, OAM, or any other Network Function.

The introduction of the DCCF into the path between a Network Function Consumer (NFc) and Network Function Producer (NFp), existing version negotiation mechanisms in Service Band Index (SBI) may not be sufficient.

For example, a NFc supporting version 1 (V1) of an API may send a request to the DCCF. The DCCF may collect data from different sources, such as AMF/SMF. Some of the AMF/SMF may not support V1 of the API, and only support V2. In some examples, the DCCF may collect the data from a AMF/SMF via V2 of the API, but the DCCF may not provide data to data consumer because the consumer may not support V2 of the API.

Alternatively, in another example, a first NFc (NFc1) may support V1 of an API, and sends a subscribe request to the DCCF. The DCCF may collect the data, and store the data in the messaging framework or Data Repository Function, and cause the data to be passed back to NFc1. Subsequently, a second NFc (NFc2) may send a request to the DCCF for the same data. However, NFc2 may support V2 of the API and not V1. As the DCCF already has the data, but for V1 and not for V2, the DCCF may have to obtain the data via V2 instead of utilising the stored V1 data, thereby leading to inefficient use of the system.

Thus, in some scenarios, the system may not be able to obtain the required data, or may do so inefficiently. Some example embodiments may address these issues.

Figure 5A:
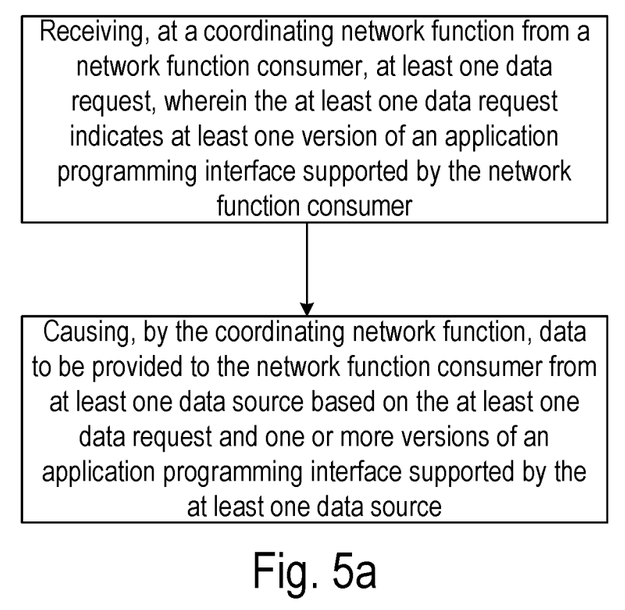
FIGS. 5*a* and 5*b* show a method according to some example embodiments.
Figure 5B:
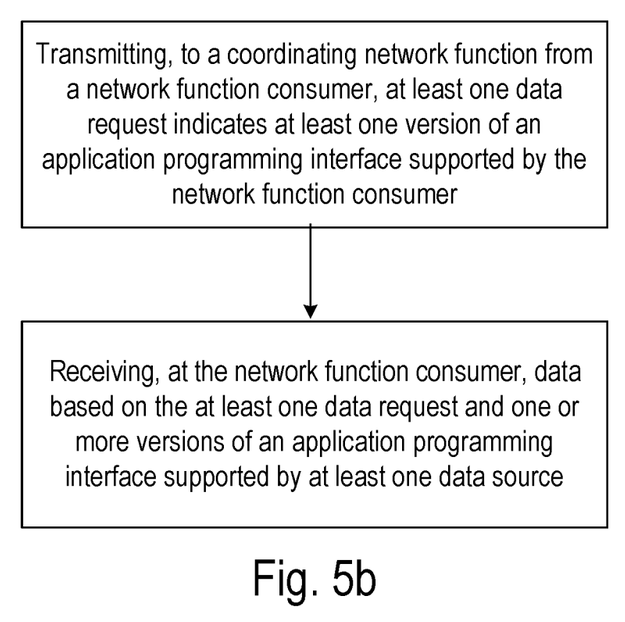

Reference is made to FIGS. 5a and 5b, which show a method according to some example embodiments.

In FIG. 5a, at step 500, the method may comprise receiving, at a coordinating network function from a network function consumer, at least one data request. The at least one data request indicates at least one version of an application programming interface supported by the network function consumer.

At step 502, the method may comprise causing, by the coordinating network function, data to be provided to the network function consumer from at least one data source based on the at least one data request and one or more versions of an application programming interface supported by the at least one data source.

In FIG. 5b, at step 504, the method may comprise transmitting, to a coordinating network function from a network function consumer, at least one data request, wherein the at least one data request indicates at least one version of an application programming interface supported by the network function consumer.

At step 506, the method may comprise receiving, at the network function consumer, data based on the at least one data request and one or more versions of an application programming interface supported by at least one data source.

In some examples, the coordinating network function may be a DCCF. In some examples, the DCCF may be a stand-alone network function, or in some examples the DCCF may be implemented as part of a NWDAF. In some examples, the NWDAF may implement the DCCF and/or messaging framework and/or DRF. In the following description, reference is made to a method performed by the DCCF. It should be understood that, in some example embodiments, the method steps may be performed by the NWDAF implementing the DCCF, or indeed any network function suitable for performing the steps. That is to say, in some examples, a coordinating data function may perform the method steps attributed to the DCCF in the following examples.

In some examples, the DCCF may indicate that the DCCF supports multiple versions of an API to a network repository function (NRF). That is to say, the DCCF may indicate that it can provide notifications on multiple API versions.

The NFc may provide a service request to the DCCF to collect data via notifications. The notification may be provided, for example using service API V1, V2 or V3 etc. The notification may comprise a uniform resource identifier (URI) specific to the API version(s) being supported by the NFc. For example, the NFc may provide a service request to the DCCF with a plurality of notification URIs, each URI indicating that a different service API version is supported. Referring to the example above the service request may include 3 URIs respectively indicating that API versions V1, V2, V3 are supported.

In some examples, the DCCF may request the NFc to provide a version specific URI to send a notification or data. The DCCF may convert versions of data received from the data source or data stored within the messaging framework or data repository function according to the version(s) supported by the NFc.

Figure 6:
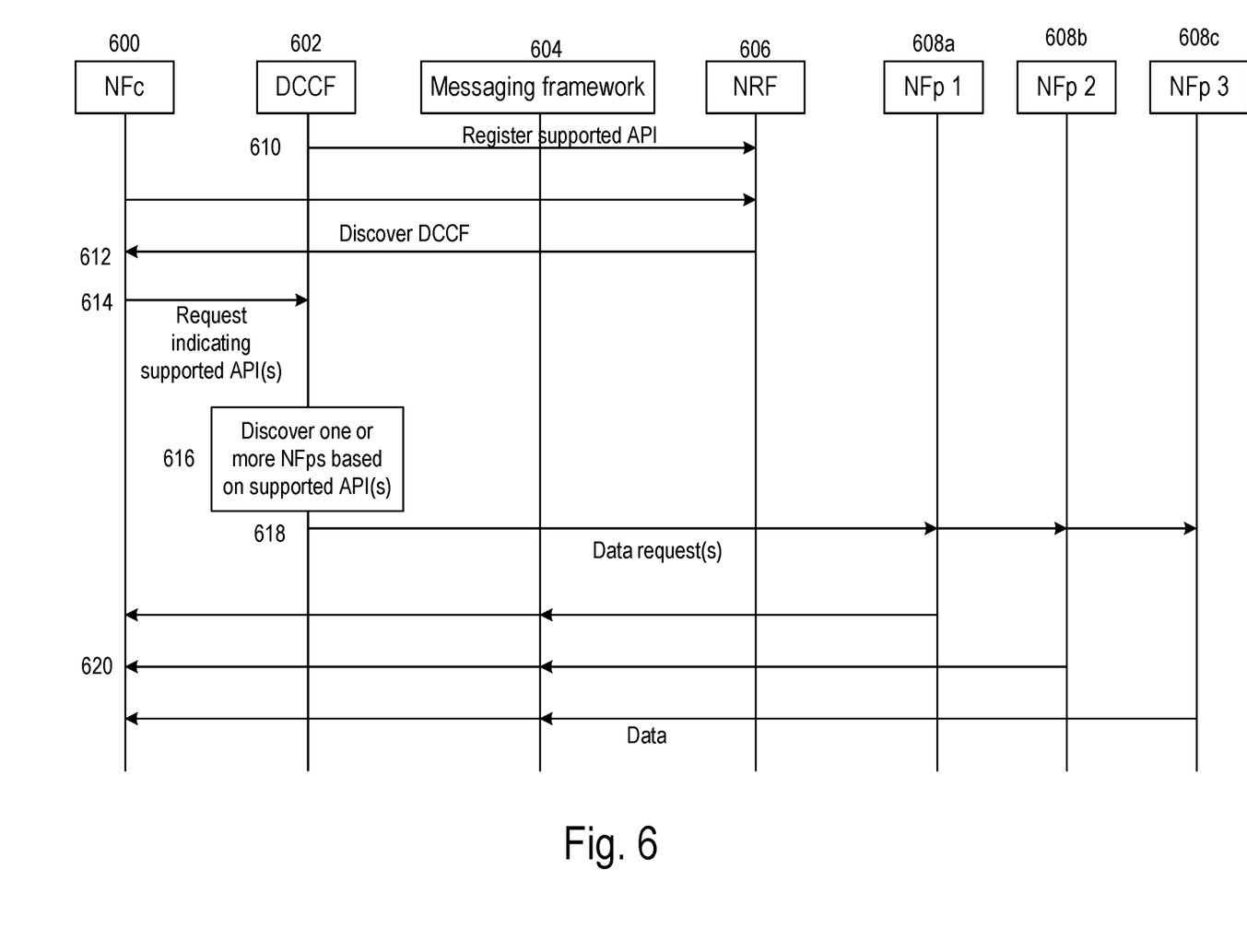
FIGS. 6 to 8 show signalling exchanges according to some examples.

Reference is made to FIG. 6, which shows a signalling exchange according to some example embodiments.

In the example of FIG. 6, a NFc 600, DCCF 602, Messaging Framework 604, NRF 606, and three different NFps 608a-c are provided.

At step 610, the DCCF 602 registers with NRF 606. The DCCF 602 may indicate to NRF 606 that DCCF 602 supports multiple notification/data versions. The NRF 606 may store information indicating that DCCF 602 supports multiple versions.

At step 612, the NFc 600 may discover DCCF 602 via NRF 606. The NFc 600 may determine that DCCF 602 supports multiple versions based on the information stored in the NRF 606.

For example, to discover DCCF 602, the NFc 600 may send a message to NRF 606, and the NRF 606 may provide a response to NFc 600 including information identifying DCCF 602 and that DCCF 602 supports multiple versions. In some examples, the NFc 600 may be a NWDAF or any network function.

At step 614, the NFc 600 may send a request to DCCF 602. The request may indicate the supported API versions at the NFc 600. For example, NFc 600 may use a single service instance for each supported API version, or may combine the API versions into a single service instance. In some examples, the request may comprise a Callback URI per supported API version. For example, if the NFc 600 supports API versions V1 and V2, then the NFc 600 may include the two supported Callback URIs corresponding to V1 and V2.

At step 616, depending on the request from NFc 600, DCCF 602 may discover one or more NFps. DCCF 602 may thus for example discover NFp 608a, NFp 608b, and NFp 608c. DCCF 602 may determine the API version(s) supported by each of the discovered NFps 608a-c. For example, DCCF 602 may determine that NFp 608a supports API V1, NFp 608b supports API V2, and NFp 608c supports API V3.

In some examples, the DCCF may send, to the NFc, a request for an indication of one or more API versions supported by the NFc. For example, the DCCF may request a version indication or version information from the NFc. In response, the NFc may send an indication of one or more API versions supported by the NFc.

At step 618, DCCF 602 may send a request for data to one or more of the NFps 608a-c based on the request and the API versions supported by the NFc 600 and NFps 608a-c. For example, if NFc 600 supports API V1, V2 and V3, then DCCF 602 may send a request to each of NFp 608a-c. However, if NFc 600 supports API V1 and V2 but not V3, then DCCF 602 may in some examples send a request to NFp 608a and 608b, but not 608c.

At step 620, the NFps 608a-c may send the requested data to the NFc 600 via messaging framework 604. DCCF 602 may coordinate delivery of the data to NFc 600.

In some examples, the NFps 608a-c may send the requested data to the NFc 600 via DCCF 602. The DCCF 602 may coordinate delivery of the data to NFc 600.

In some examples, data is already available in the DRF as data source. The DCCF 602 may coordinate delivery of the data to NFc 600 after collecting it from a DRF.

Figure 7:
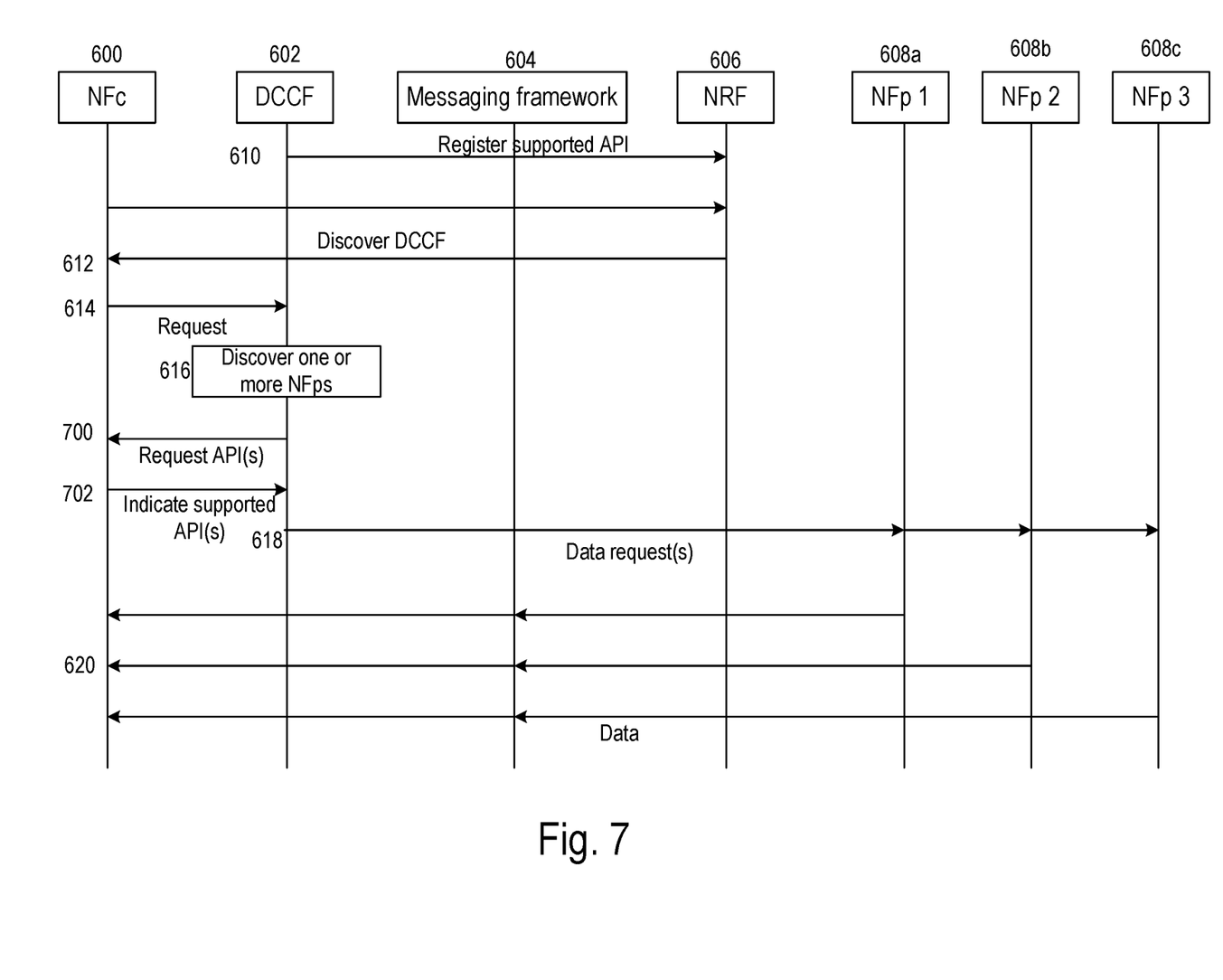

Reference is made to FIG. 7, which shows a signalling exchange according to some example embodiments. FIG. 7 shows a modified exchange of FIG. 6, where corresponding elements are given the same reference numeral.

The example of FIG. 7 differs from the example in FIG. 6 in that the initial data request sent from NFc 600 to DCCF 602 at step 614 does not indicate the API version(s) supported by the NFc 600.

Thus, at step 700, DCCF 602 sends a request to NFc 600 to share one or more version specific Callback URIs indicating a respective one or more API versions supported by NFc 600.

At step 702, NFc 600 sends a response to DCCF 602 indicating the callback URI(s) of the API version(s) supported by the NFc 600. The response may comprise a single service instance for each supported URI, or may combine the URIs into a single service instance. In some examples, the response may comprise a Callback URI per supported API version. For example, if the NFc 600 supports API versions V1 and V2, then the NFc 600 may include the two supported Callback URIs corresponding to V1 and V2.

The remainder of the signalling exchange shown in FIG. 7 may then proceed as described in relation to FIG. 6.

Figure 8:
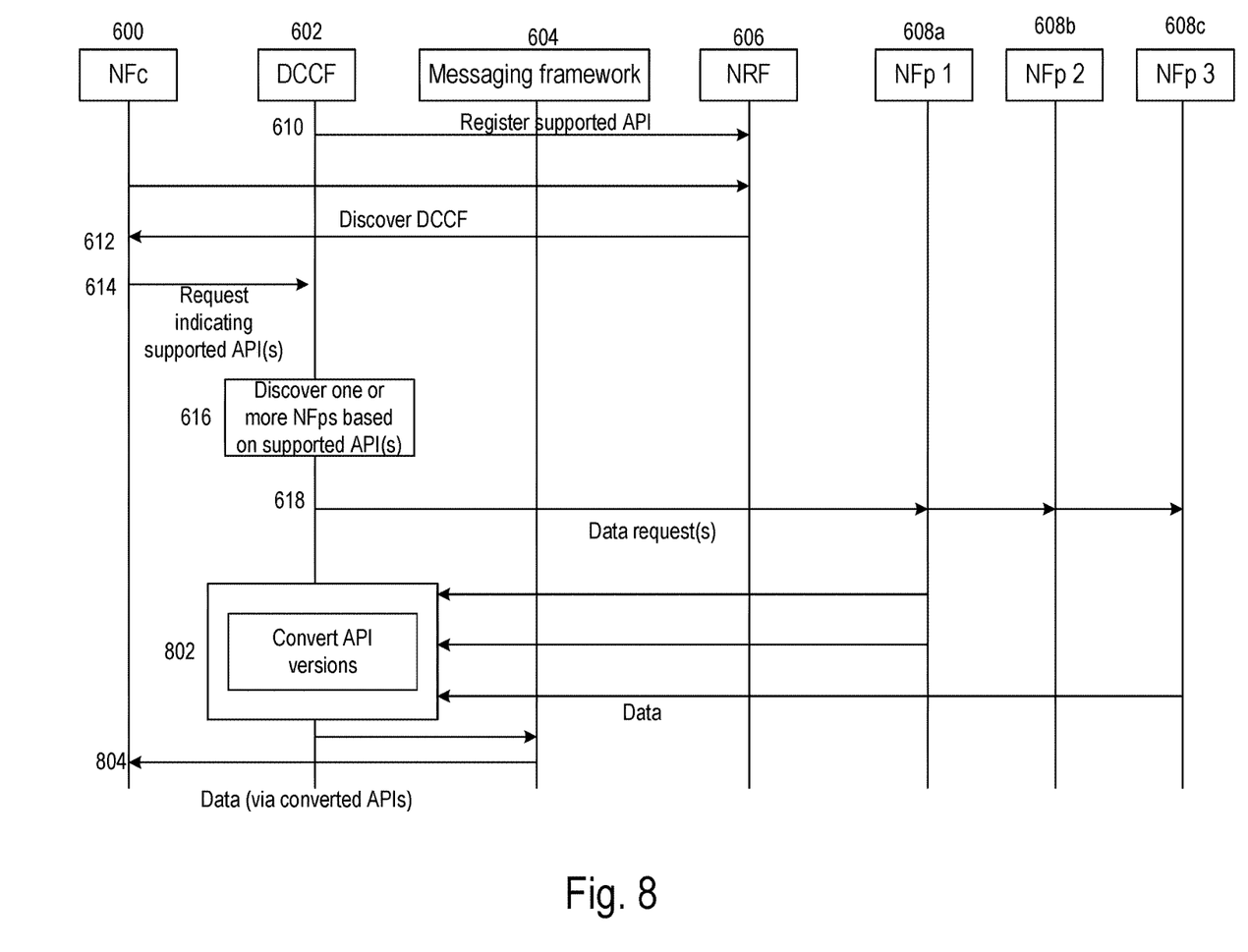

Reference is made to FIG. 8, which shows a signalling exchange according to some example embodiments. FIG. 8 shows a modified exchange of FIG. 6, where corresponding elements are given the same reference numeral.

The example of FIG. 8 differs from the example in FIG. 6 in that the DCCF 602 may have the capability of converting between API versions.

The example of FIG. 8 begins with steps 610-618 as described in relation to FIG. 6.

At step 800, DCCF 602 may receive, from the NFps 608a-608c, data respectively corresponding to a particular API version. For example, DCCF 602 may receive data for API V1 from NFp 608a, data for API V2 from NFp 608b, and data for API V3 from NFp 608c.

At step 802, DCCF 602 may then convert the received data for one API version into another API version. The conversion may be based on the API version(s) supported by the NFc 600.

While not shown in the Figure, in some examples, messaging framework 604 and/or DRF 606 may convert the received data for one API version into another API version instead of or in addition to DCCF 602.

The Messaging Framework 604 may propagate data received from a data source, such as a NFp or DRF, to an endpoint specified by the NFc. Each NFc may specify multiple notification endpoints, which may include different version specific URIs The Messaging Framework may support a publish-subscribe protocol, where data produced by a NFp is published and requests from a NFc are in the form messaging framework specific subscriptions. Alternatively the Messaging Framework may support other protocols.

In some examples, the messaging framework is configured to enable the DCCF to convey to the messaging framework the data the messaging framework will receive from a Data Source, along with formatting and processing instructions and NFc notification endpoints.

In the example shown in FIG. 8, NFc 600 supports only API V2. Thus, at step 800, DCCF 602 may convert data for API V1 received from NFp 608a and data for API V3 received from NFp 608c into API V2.

At step 802, DCCF 602 may transmit the data to NFc 600 using API V2. At step 804, the data may be transmitted via the messaging framework 604.

In some examples, when converting from an original API version to a target API version, an optional attribute may be discarded if it does not match with the target API version. In some examples, if an attribute is mandatory or conditional in the target API version but is missing from the original API version, a default value for the attribute may be used.

It should be understood that the examples referred to in FIGS. 6-8 may be implemented in combination.

For example, while not shown, step 800 of the NFps sending data to the DCCF 602, and step 802 of the DCCF 602 converting the API version of the received data to another version, may also be used in combination with the method shown in FIG. 7 or FIG. 6.

For instance, the NFc may indicate the versions of APIs supported by the NFc to the DCCF in a subscribe request. Accordingly, the DCCF may route a notification to the NFc. If the notification is for an API version not supported by the NFc, the DCCF may convert the notification to an API version supported by the NFc. The NFc may, for example, be a NWDAF or any network function.

As a further example, if the DCCF determines that the NFc supports API V1 and V2 but not V3 (for example using the method of FIG. 6 or 7), the DCCF may provide for conversion from API V3 to API V1 and/or V2 (as per FIG. 8).

In some examples, an apparatus is provided comprising means for receiving, at a coordinating network function from a network function consumer, at least one data request, wherein the at least one data request indicates at least one version of an application programming interface supported by the network function consumer; and causing, by the coordinating network function, data to be provided to the network function consumer from at least one data source based on the at least one data request and one or more versions of an application programming interface supported by the at least one data source.

In some examples, an apparatus is provided comprising means for: transmitting, to a coordinating network function from a network function consumer, at least one data request, wherein the at least one data request indicates at least one version of an application programming interface supported by the network function consumer; and receiving, at the network function consumer, data based on the at least one data request and one or more versions of an application programming interface supported by at least one data source.

In some examples, the apparatus may comprise at least one memory and at least one processor, the at least one memory comprising computer readable instructions which, when implemented by the at least one processor, cause the apparatus to receive, at a coordinating network function from a network function consumer, at least one data request, wherein the at least one data request indicates at least one version of an application programming interface supported by the network function consumer; and cause, by the coordinating network function, data to be provided to the network function consumer from at least one data source based on the at least one data request and one or more versions of an application programming interface supported by the at least one data source.

In some examples, there is provided an apparatus comprising at least one processor and at least one memory including a computer program code, the at least one memory and computer program code configured to, with the at least one processor, cause the apparatus at least to: transmit, to a coordinating network function from a network function consumer, at least one data request, wherein the at least one data request indicates at least one version of an application programming interface supported by the network function consumer; and receive, at the network function consumer, data based on the at least one data request and one or more versions of an application programming interface supported by at least one data source.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst some embodiments have been described in relation to 5G networks, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:
 (a) hardware-only circuit implementations (such as implementations in only analog and/or digital circuitry) and
 (b) combinations of hardware circuits and software, such as (as applicable):
  (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

Further examples are provided below:

Example 1: An apparatus comprising means for:
  receiving, at a coordinating network function from a network function consumer, at least one data request, wherein the at least one data request indicates at least one version of an application programming interface supported by the network function consumer; and
  causing, by the coordinating network function, data to be provided to the network function consumer from at least one data source based on the at least one data request and one or more versions of an application programming interface supported by the at least one data source.

Example 2. The apparatus of Example 1, wherein the at least one data request comprises a plurality of identifiers, wherein each of the plurality of identifiers indicates a respective application programming interface supported by the network function consumer.

Example 3. The apparatus of any preceding Example, wherein the means is for:
  providing, to a network repository function, an indication that the coordinating network function supports multiple versions of an application programming interface.

Example 4. The apparatus of any preceding Example, wherein the means is for:
  sending, to the at least one data source, information for causing the data to be delivered to the network function consumer.

Example 5. The apparatus of any preceding Example, wherein the means is for:
  selecting, by the coordinating network function, the at least one data source for providing the data based on whether the version of the application programming interface supported by the at least one data source is also supported by the network function consumer.

Example 6. The apparatus of any preceding Example, wherein the means is for:
  sending, to the network function consumer, a request for an indication of one or more versions of the application programming interface supported by the network function consumer; and
  receiving, from the network function consumer, the indication of the one or more versions of the application programming interface supported by the network function consumer.

Example 7. The apparatus of any preceding Example, wherein the at least one data source comprises a plurality of data sources, and wherein each of the plurality of data sources supports one or more versions of the application programming interface.

Example 8. The apparatus of any preceding Example, wherein the means is for:
- receiving, from the at least one data source, the data via a first version of the application programming interface;
- converting the data from the first version of the application programming interface to a second version of the application programming interface; and
- causing the data to be sent to the network function consumer via the second version of the application programming interface.

Example 9. The apparatus of any preceding Example, wherein the apparatus comprises at least one of:
- a data collection coordination function;
- a data repository function;
- a messaging framework; and
- a network data application function.

Example 10. The apparatus of any preceding Example, wherein the coordinating network function is one of:
- a data collection coordination function;
- a network data application function;
- a messaging framework; and
- a data repository function.

Example 11. An apparatus comprising means for:
- transmitting, to a coordinating network function from a network function consumer, at least one data request, wherein the at least one data request indicates at least one version of an application programming interface supported by the network function consumer; and
- receiving, at the network function consumer, data based on the at least one data request and one or more versions of an application programming interface supported by at least one data source.

Example 12. The apparatus of Example 11, wherein the data is received from at least one of:
- the at least one data source;
- the coordinating network function;
- a messaging framework; and
- a data repository function.

Example 13. The apparatus of any of Examples 11 or 12, wherein the at least one data request comprises a plurality of data requests, wherein each of the plurality of data requests indicates a respective version of the application programming interface supported by the network function consumer.

Example 14. The apparatus of any of Examples 11 to 13, wherein the means is for:
- receiving, from the coordinating network function, a request for an indication of one or more versions of the application programming interface supported by the apparatus; and
- transmitting, to the coordinating network function, the indication of the one or more versions of the application programming interface supported by the apparatus.

Example 15. The apparatus of any of Examples 11 to 14, wherein the means is for:
- transmitting, from the network function consumer to a network repository function, a message for discovering the data collection coordination function; and
- receiving, at the network function consumer from the network repository function, a response identifying the data collection coordination function and information indicating that the data collection coordination function supports multiple versions of an application programming interface.

Example 16. A method comprising:
- receiving, at a coordinating network function from a network function consumer, at least one data request, wherein the at least one data request indicates at least one version of an application programming interface supported by the network function consumer; and
- causing, by the coordinating network function, data to be provided to the network function consumer from at least one data source based on the at least one data request and one or more versions of an application programming interface supported by the at least one data source.

Example 17. A method comprising:
- transmitting, to a coordinating network function from a network function consumer, at least one data request, wherein the at least one data request indicates at least one version of an application programming interface supported by the network function consumer; and
- receiving, at the network function consumer, data based on the at least one data request and one or more versions of an application programming interface supported by at least one data source.

Example 18. An apparatus comprising at least one processor and at least one memory including a computer program code, the at least one memory and computer program code configured to, with the at least one processor, cause the apparatus at least to:
- receive, at a coordinating network function from a network function consumer, at least one data request, wherein the at least one data request indicates at least one version of an application programming interface supported by the network function consumer; and
- cause, by the coordinating network function, data to be provided to the network function consumer from at least one data source based on the at least one data request and one or more versions of an application programming interface supported by the at least one data source.

Example 19. An apparatus comprising at least one processor and at least one memory including a computer program code, the at least one memory and computer program code configured to, with the at least one processor, cause the apparatus at least to:
- transmit, to a coordinating network function from a network function consumer, at least one data request, wherein the at least one data request indicates at least one version of an application programming interface supported by the network function consumer; and
- receive, at the network function consumer, data based on the at least one data request and one or more versions of an application programming interface supported by at least one data source.

Example 20. A computer readable medium comprising program instructions for causing an apparatus to perform at least the following:
- receiving, at a coordinating network function from a network function consumer, at least one data request, wherein the at least one data request indicates at least one version of an application programming interface supported by the network function consumer; and
- causing, by the coordinating network function, data to be provided to the network function consumer from at least one data source based on the at least one data request and one or more versions of an application programming interface supported by the at least one data source.

Example 21. A computer readable medium comprising program instructions for causing an apparatus to perform at least the following:

transmitting, to a coordinating network function from a network function consumer, at least one data request, wherein the at least one data request indicates at least one version of an application programming interface supported by the network function consumer; and receiving, at the network function consumer, data based on the at least one data request and one or more versions of an application programming interface supported by at least one data source.

Example 22. A non-transitory computer readable medium comprising program instructions for causing an apparatus to perform at least:

receiving, at a coordinating network function from a network function consumer, at least one data request, wherein the at least one data request indicates at least one version of an application programming interface supported by the network function consumer; and causing, by the coordinating network function, data to be provided to the network function consumer from at least one data source based on the at least one data request and one or more versions of an application programming interface supported by the at least one data source.

Example 23. A non-transitory computer readable medium comprising program instructions for causing an apparatus to perform at least:

transmitting, to a coordinating network function from a network function consumer, at least one data request, wherein the at least one data request indicates at least one version of an application programming interface supported by the network function consumer; and receiving, at the network function consumer, data based on the at least one data request and one or more versions of an application programming interface supported by at least one data source.

The invention claimed is:

1. An apparatus, comprising:
at least one processor; and
at least one memory including a computer program code, the at least one memory and computer program code configured to, with the at least one processor, cause the apparatus at least to:
receive, from a network function consumer, at least one data request, wherein the at least one data request comprises a plurality of identifiers, wherein each of the plurality of identifiers indicates a respective application programming interface, and wherein the at least one request indicates at least one version of an application programming interface supported by the network function consumer; and
cause, data to be provided to the network function consumer from at least one data source based on the at least one data request and one or more versions of an application programming interface supported by the at least one data source.

2. The apparatus of claim 1, wherein the at least one memory and computer program code is further configured to, with the at least one processor, cause the apparatus at least to perform:
providing, to a network repository function, an indication that the apparatus supports multiple versions of an application programming interface.

3. The apparatus of claim 1, wherein the at least one memory and computer program code is further configured to, with the at least one processor, cause the apparatus at least to perform:

sending, to the at least one data source, information for causing the data to be delivered to the network function consumer.

4. The apparatus of claim 1, wherein the at least one memory and computer program code is further configured to, with the at least one processor, cause the apparatus at least to perform:
selecting the at least one data source for providing the data based on whether a version of the application programming interface supported by the at least one data source is also supported by the network function consumer.

5. The apparatus of claim 1, wherein the at least one memory and computer program code is further configured to, with the at least one processor, cause the apparatus at least to perform:
sending, to the network function consumer, a request for an indication of one or more versions of the application programming interface supported by the network function consumer; and
receiving, from the network function consumer, the indication of the one or more versions of the application programming interface supported by the network function consumer.

6. The apparatus of claim 1, wherein the at least one data source comprises a plurality of data sources, and wherein each of the plurality of data sources supports one or more versions of the application programming interface.

7. The apparatus of claim 1, wherein the at least one memory and computer program code is further configured to, with the at least one processor, cause the apparatus at least to perform:
receiving, from the at least one data source, the data via a first version of the application programming interface;
converting the data from the first version of the application programming interface to a second version of the application programming interface; and
causing the data to be sent to the network function consumer via the second version of the application programming interface.

8. The apparatus of claim 1, wherein the apparatus comprises at least one of:
a data collection coordination function;
a data repository function;
a messaging framework; and
a network data application function.

9. An apparatus comprising:
at least one processor; and
at least one memory including a computer program code for a network function consumer, the at least one memory and computer program code configured to, with the at least one processor, cause the apparatus at least to:
transmit, to a coordinating network function from a network function consumer, at least one data request, wherein the at least one data request comprises a plurality of data requests, wherein each of the plurality of data requests indicates a respective version of the application programming interface, and wherein the at least one request indicates at least one version of an application programming interface supported by the network function consumer; and
receive, at the network function consumer, data based on the at least one data request and one or more versions of an application programming interface supported by at least one data source.

10. The apparatus of claim 9, wherein the data is received from at least one of:
- the at least one data source;
- the coordinating network function;
- a messaging framework; and
- a data repository function.

11. The apparatus of claim 9, wherein the at least one memory and computer program code is further configured to, with the at least one processor, cause the apparatus at least to perform:
- receiving, from the coordinating network function, a request for an indication of one or more versions of the application programming interface supported by the apparatus; and
- transmitting, to the coordinating network function, the indication of the one or more versions of the application programming interface supported by the apparatus.

12. The apparatus of claim 9, wherein the at least one memory and computer program code is further configured to, with the at least one processor, cause the apparatus at least to perform:
- transmitting, from the network function consumer to a network repository function, a message for discovering a data collection coordination function; and
- receiving, at the network function consumer from the network repository function, a response identifying the data collection coordination function and information indicating that the data collection coordination function supports multiple versions of an application programming interface.

13. A method, comprising:
- receiving, from a network function consumer, at least one data request, wherein the at least one data request comprises a plurality of identifiers, wherein each of the plurality of identifiers indicates a respective application programming interface, and wherein the at least one request indicates at least one version of an application programming interface supported by the network function consumer; and
- causing data to be provided to the network function consumer from at least one data source based on the at least one data request and one or more versions of an application programming interface supported by the at least one data source.

14. The method of claim 13, further comprising:
- providing, to a network repository function, an indication that an apparatus supports multiple versions of an application programming interface.

15. The method of claim 13, further comprising:
- sending, to the at least one data source, information for causing the data to be delivered to the network function consumer.

16. A method, comprising:
- transmitting, to a coordinating network function from a network function consumer, at least one data request, wherein the at least one data request comprises a plurality of data requests, wherein each of the plurality of data requests indicates a respective version of the application programming interface, and wherein the at least one request indicates at least one version of an application programming interface supported by the network function consumer; and
- receiving, at the network function consumer, data based on the at least one data request and one or more versions of an application programming interface supported by at least one data source.

17. The method of claim 16, further comprising:
- receiving, from the coordinating network function, a request for an indication of one or more versions of the application programming interface supported by the network function consumer; and
- transmitting, to the coordinating network function, the indication of the one or more versions of the application programming interface supported by the network function consumer.

\* \* \* \* \*